(12) United States Patent
Chou (10) Patent No.: US 8,746,293 B2
(45) Date of Patent: Jun. 10, 2014

(54) DEVICE FOR SEALING AND INFLATING INFLATABLE OBJECT

(76) Inventor: Wen San Chou, Tainan (TW)

(*) Notice: Subject to any disclaimer, the term of this patent is extended or adjusted under 35 U.S.C. 154(b) by 345 days.

(21) Appl. No.: 13/317,183

(22) Filed: Oct. 12, 2011

(65) Prior Publication Data

US 2013/0092286 A1 Apr. 18, 2013

(51) Int. Cl.
*B29C 73/16* (2006.01)
*B29C 73/02* (2006.01)

(52) U.S. Cl.
CPC ................... *B29C 73/166* (2013.01);
*B29C 73/025* (2013.01)
USPC ............................................. 141/38; 152/415

(58) Field of Classification Search
CPC .... B29C 73/025; B29C 73/16; B29C 73/163; B29C 73/166
USPC ............................................. 141/38; 152/415
See application file for complete search history.

(56) References Cited

U.S. PATENT DOCUMENTS

| | | | |
|---|---|---|---|
| 4,765,367 A * | 8/1988 | Scott ............................. | 137/607 |
| 5,070,917 A * | 12/1991 | Ferris et al. ..................... | 141/38 |
| 6,176,285 B1 | 1/2001 | Gerresheim et al. | |
| 6,283,172 B1 | 9/2001 | Thurner | |
| 6,345,650 B1 | 2/2002 | Paasch et al. | |
| 6,454,892 B1 | 9/2002 | Gerresheim et al. | |
| 6,789,581 B2 * | 9/2004 | Cowan et al. ................... | 141/38 |
| 6,889,723 B2 | 5/2005 | Gerresheim et al. | |
| 7,021,348 B2 | 4/2006 | Eriksen et al. | |
| 7,178,564 B2 | 2/2007 | Kojima et al. | |
| 7,389,800 B2 * | 6/2008 | Hickman et al. ................ | 141/26 |
| 7,694,698 B2 * | 4/2010 | Marini ............................ | 141/38 |
| 7,789,110 B2 * | 9/2010 | Marini ............................ | 141/38 |
| 7,798,183 B2 * | 9/2010 | Cegelski et al. ................ | 141/38 |
| 7,878,360 B2 * | 2/2011 | Takeda ....................... | 220/203.13 |
| 7,891,385 B2 * | 2/2011 | Yanagi et al. ................... | 141/38 |
| 8,016,002 B2 * | 9/2011 | Yoshida et al. ................. | 141/38 |
| 8,146,622 B2 * | 4/2012 | Guan et al. ...................... | 141/38 |
| 8,201,586 B2 * | 6/2012 | Yoshida et al. ................. | 141/38 |
| 8,205,645 B2 * | 6/2012 | Dowel ............................ | 141/38 |
| 8,226,377 B2 * | 7/2012 | Yoshida et al. ............... | 417/151 |
| 8,251,105 B2 * | 8/2012 | Lolli et al. ...................... | 141/38 |
| 8,251,106 B2 * | 8/2012 | Lolli ............................... | 141/38 |
| 8,297,321 B2 * | 10/2012 | Chou .............................. | 141/38 |
| 8,336,581 B2 * | 12/2012 | Lolli et al. ...................... | 141/38 |
| 8,413,692 B1 * | 4/2013 | Hickman et al. ................ | 141/38 |
| 8,453,683 B2 * | 6/2013 | Yoshida et al. ................. | 141/38 |
| 8,453,684 B2 * | 6/2013 | Lolli ............................... | 141/38 |
| 8,459,150 B2 * | 6/2013 | Yoshida et al. ................ | 81/15.6 |
| 8,491,275 B2 * | 7/2013 | Lolli et al. ...................... | 417/313 |
| 8,505,591 B2 * | 8/2013 | Eckhardt ......................... | 141/38 |
| 8,522,833 B2 * | 9/2013 | Chou .............................. | 141/38 |
| 8,528,448 B2 * | 9/2013 | Lolli ............................... | 81/15.6 |

(Continued)

*Primary Examiner* — Gregory Huson
*Assistant Examiner* — Nicolas A Arnett
(74) *Attorney, Agent, or Firm* — Charles E. Baxley (57) ABSTRACT

A sealing and inflating assembly includes a tire repairing container for receiving a sealing preparation, an outlet piece attached to a mouth opening of the tire repairing container and having an inlet conduit and an outlet conduit, the outlet piece includes a pipe extended into the tire repairing container and includes a cover releasably attached to the pipe for releasably blocking the bore of the pipe, and includes a cap releasably blocking the outlet conduit, and an actuating device selectively disengages the cover from the pipe and selectively disengages the cap from the outlet piece for supplying the pressurized air into the tire repairing container and to force the sealing preparation to flow out of the outlet piece.

15 Claims, 11 Drawing Sheets

(56) References Cited

U.S. PATENT DOCUMENTS

| | | | | |
|---|---|---|---|---|
| 8,578,986 | B2* | 11/2013 | Majumdar | 152/503 |
| 2002/0112777 | A1* | 8/2002 | Fang et al. | 141/38 |
| 2004/0159365 | A1* | 8/2004 | Cowan et al. | 141/38 |
| 2005/0056358 | A1* | 3/2005 | Eriksen et al. | 152/502 |
| 2005/0191193 | A1* | 9/2005 | Chou | 417/437 |
| 2006/0142420 | A1* | 6/2006 | Nakazawa et al. | 523/166 |
| 2006/0217662 | A1* | 9/2006 | Hickman et al. | 604/153 |
| 2006/0272731 | A1* | 12/2006 | Takeda | 141/38 |
| 2008/0029181 | A1* | 2/2008 | Marini | 141/38 |
| 2008/0098855 | A1* | 5/2008 | Cegelski et al. | 81/15.6 |
| 2008/0145245 | A1* | 6/2008 | Chou | 417/415 |
| 2008/0257448 | A1* | 10/2008 | Hickman et al. | 141/26 |
| 2008/0277044 | A1* | 11/2008 | Marini | 156/97 |
| 2009/0050232 | A1* | 2/2009 | Guan et al. | 141/38 |
| 2009/0056850 | A1* | 3/2009 | Yanagi et al. | 152/504 |
| 2009/0107578 | A1* | 4/2009 | Trachtenberg et al. | 141/5 |
| 2009/0139604 | A1* | 6/2009 | Lolli | 141/38 |
| 2009/0193937 | A1* | 8/2009 | Steele et al. | 81/15.2 |
| 2009/0266440 | A1* | 10/2009 | Lolli et al. | 141/38 |
| 2009/0277534 | A1* | 11/2009 | Yoshida et al. | 141/38 |
| 2009/0301602 | A1* | 12/2009 | Lolli et al. | 141/38 |
| 2010/0005930 | A1* | 1/2010 | Lolli et al. | 81/15.5 |
| 2010/0108186 | A1* | 5/2010 | Yoshida et al. | 141/38 |
| 2010/0108187 | A1* | 5/2010 | Lolli | 141/38 |
| 2010/0139806 | A1* | 6/2010 | Lolli | 141/38 |
| 2010/0147416 | A1* | 6/2010 | Chou | 141/38 |
| 2010/0189575 | A1* | 7/2010 | Yoshida et al. | 417/151 |
| 2010/0206426 | A1* | 8/2010 | Lolli | 141/38 |
| 2010/0224281 | A1* | 9/2010 | Yoshida et al. | 141/38 |
| 2011/0041951 | A1* | 2/2011 | Lolli | 141/38 |
| 2011/0116941 | A1* | 5/2011 | Lolli et al. | 417/313 |
| 2011/0126938 | A1* | 6/2011 | Eckhardt | 141/38 |
| 2011/0155279 | A1* | 6/2011 | Marini | 141/5 |
| 2011/0155280 | A1* | 6/2011 | Eckhardt | 141/38 |
| 2011/0180180 | A1* | 7/2011 | Lolli et al. | 141/38 |
| 2011/0290372 | A1* | 12/2011 | Dowel | 141/37 |
| 2012/0000572 | A1* | 1/2012 | Chou | 141/38 |
| 2012/0000573 | A1* | 1/2012 | Chou | 141/38 |
| 2012/0017727 | A1* | 1/2012 | Lolli | 81/15.5 |
| 2012/0034124 | A1* | 2/2012 | Lolli | 418/152 |
| 2012/0037267 | A1* | 2/2012 | Senno et al. | 141/38 |
| 2012/0042987 | A1* | 2/2012 | Lolli | 141/94 |
| 2012/0231100 | A1* | 9/2012 | Chou | 425/12 |
| 2013/0048146 | A1* | 2/2013 | Eckhardt | 141/38 |
| 2013/0105055 | A1* | 5/2013 | Chou | 152/416 |
| 2013/0199665 | A1* | 8/2013 | Lolli et al. | 141/38 |
| 2013/0220483 | A1* | 8/2013 | Eckhardt | 141/38 |
| 2013/0284312 | A1* | 10/2013 | Chou | 141/38 |

* cited by examiner

DEVICE FOR SEALING AND INFLATING INFLATABLE OBJECT

BACKGROUND OF THE INVENTION

1. Field of the Invention

The present invention relates to an air compressor or a sealing and inflating assembly for sealing and inflating an inflatable object, and more particularly to an air compressing device including an improved tire repairing container for quickly coupling and attaching and securing to an outlet tube of the air compressor and for quickly disengaging from the air compressor and for allowing the tire sealing preparation to be effectively supplied to seal and inflate the inflatable objects.

2. Description of the Prior Art

Various kinds of typical air compressing devices have been developed by the applicant and comprise a cylinder housing, a piston slidably received in the cylinder housing, and a motor coupled or attached to the cylinder housing and coupled to the piston for moving the piston relative to the cylinder housing in a reciprocating action, in order to generate a pressurized air of a greater air pressure and a decreased flowing quantity, and a pressure tight container for receiving a sealing preparation and for selectively supplying the sealing preparation to seal and inflate the inflatable objects, such as vehicle tires, air beds, air cushions, hovercrafts, etc.

For example, U.S. Pat. No. 6,176,285 to Gerresheim et al., U.S. Pat. No. 6,283,172 to Thurner, and U.S. Pat. No. 6,345,650 to Paasch et al. disclose several of the typical preparations for the sealing of tires with punctures, and repairing apparatuses for the sealing and pumping up of tires and tires with an integrated sealing preparation comprising a pressure tight container that is coupled to a pressurized air cartridge.

However, the pressure tight container and the pressurized air cartridge are coupled together with a shut off valve, a gas outlet, a gas inlet and may not be easily disengaged from each other, and an outlet valve and an additional riser tube are further required to be attached or mounted to the upper portion of the pressure tight container for allowing the sealing preparation to be selectively supplied to seal and inflate the inflatable objects, but may not be easily connected or coupled to the air compressor devices. In addition, the sealing preparation may not be easily forced to flow upwardly and to flow out through the pressure tight container by the pressurized air particularly in the cool or cold environment where the pressurized air may not easily flow through the sealing preparation.

U.S. Pat. No. 6,454,892 to Gerresheim et al. and U.S. Pat. No. 6,889,723 to Gerresheim et al. disclose two of the typical preparations for sealing punctured tires and apparatuses for the sealing and pumping up of tires, and each comprising a pressure tight container coupled to an air compressor, and a shut off valve and a gas inlet are coupled to the air compressor and the pressure tight container for supplying the pressurized air to force the sealing preparation to seal the inflatable objects.

However, the pressure tight container may not be easily removed from the air compressor, and the air compressor also may not be easily and quickly and directly coupled to the inflatable objects and to readily inflate the inflatable objects, such as tires, air beds, air cushions, hovercrafts, etc., in addition, the puncture sealant is required to flow out through the shut off valve and the outlet valve. Furthermore, the gas inlet may not be blocked or sealed and the sealing preparation may have a good chance to flow into the gas inlet.

U.S. Pat. No. 7,021,348 to Eriksen et al. discloses a further typical device for sealing and inflating an inflatable object and comprising a tubular container coupled to an air compressor, and a complicated coupling structure is further required for coupling the tubular container to the air compressor.

However, similarly, the tubular container may not be easily and quickly removed from the air compressor, and the air compressor may not be easily and quickly and directly coupled to the inflatable objects and to inflate the inflatable objects, in addition, the puncture sealant is required to flow through the complicated coupling structure. Furthermore, a complicated and expensive structure should be formed in the tubular container for separating the pressurized air from the sealing preparation.

U.S. Pat. No. 7,178,564 to Kojima et al. discloses a still further typical supplying/removing device of puncture sealant of tire and comprising a pressure resistant bottle coupled to an air compressor or a high pressure source, and a complicated coupling apparatus body is further required for coupling the pressure resistant bottle to the air compressor.

However, similarly, the pressure resistant bottle may not be easily removed from the air compressor, and the air compressor may not be easily and quickly and directly coupled to the inflatable objects and to inflate the inflatable objects, in addition, the puncture sealant is required to flow through the complicated coupling apparatus body, and the pressurized air should flow through the sticky or pasty sealing preparation, but the pressurized air may not easily flow through the sealing preparation particularly in the cold environment.

The present invention has arisen to mitigate and/or obviate the afore-described disadvantages of the conventional air compressor devices and/or sealing and inflating devices for sealing and inflating the inflatable objects.

SUMMARY OF THE INVENTION

The primary objective of the present invention is to provide a sealing and inflating assembly comprising an air compressing device including an improved tire repairing container for quickly coupling and attaching and securing to an outlet tube of the air compressor and for quickly disengaging from the air compressor and for allowing the tire sealing preparation to be effectively supplied to seal and inflate the inflatable objects.

The other objective of the present invention is to provide a sealing and inflating assembly for sealing and inflating an inflatable object comprising a tire repairing container that may be easily and quickly and changeably attached and secured to the outlet tube of the air compressor.

The further objective of the present invention is to provide a sealing and inflating assembly for sealing and inflating an inflatable object comprising a pipe extended into the tire repairing container for directing and guiding the pressurized air to flow into the compartment of the tire repairing container without flowing through the tire sealing preparation.

The still further objective of the present invention is to provide a sealing and inflating assembly for sealing and inflating an inflatable object comprising an actuating member for easily opening the pipe and for allowing the pressurized air to easily flow into the compartment of the tire repairing container and for allowing the tire sealing preparation to be effectively supplied to seal and inflate the inflatable objects.

In accordance with one aspect of the invention, there is provided a sealing and inflating assembly comprising a tire repairing container including a compartment formed therein for receiving a sealing preparation, and including a mouth opening formed therein, an outlet piece attached to the mouth opening of the tire repairing container, and including an entrance having an inlet conduit formed therein for guiding a pressurized air to flow through the outlet piece and then into the compartment of the tire repairing container, and including an exit having an outlet conduit formed therein and communicative with the compartment of the tire repairing container for allowing the sealing preparation in the compartment of the tire repairing container to selectively flow out through the outlet conduit of the exit of the outlet piece, and the outlet piece including a pipe extended therefrom and engaged into the compartment of the tire repairing container, and including a bore formed in the pipe and communicative with the inlet conduit of the outlet piece for guiding the pressurized air to flow through the bore of the pipe and into the compartment of the tire repairing container, a cover releasably attached to the pipe for releasably blocking the bore of the pipe and for preventing the sealing preparation from flowing into the bore of the pipe before the cover is removed from the pipe, a cap releasably attached to the outlet piece for releasably blocking the outlet conduit of the exit of the outlet piece and for allowing the sealing preparation to selectively flow out through the outlet conduit of the exit of the outlet piece when the cap is disengaged from the outlet piece, and an actuating device for selectively disengaging the cover from the pipe and for selectively disengaging the cap from the outlet piece and for allowing the pressurized air to be selectively flown through the inlet conduit of the entrance of the outlet piece and the bore of the pipe and into the compartment of the tire repairing container, and to selectively force the sealing preparation in the compartment of the tire repairing container to flow out through the outlet conduit of the exit of the outlet piece.

The actuating device includes an actuating member slidably disposed or engaged in the inlet conduit of the entrance of the outlet piece and in the bore of the pipe for selectively engaging with the cover and for selectively disengaging the cover from the pipe when the actuating member is moved relative to the outlet piece. The actuating member may be selected from a flexible wire member or the like.

The actuating member includes a first end portion located close to the cover, and includes a second end portion located in the inlet conduit of the entrance of the outlet piece, and includes at least one protrusion extended from the second end portion of the actuating member for forming at least one passage and for allowing the pressurized air to selectively flow through the passage and to flow through the inlet conduit of the entrance of the outlet piece and the bore of the pipe.

An air compressing device may further be provided and include an outlet tube for engaging with the entrance of the outlet piece, and for selectively engaging with the second end portion of the actuating member and for selectively disengaging the cover from the pipe when the actuating member is moved relative to the outlet piece with the outlet tube.

The actuating device includes an actuating element engaged in the outlet conduit of the exit of the outlet piece for selectively engaging with the cap and for selectively disengaging the cap from the outlet piece when the actuating element is moved relative to the outlet piece. The actuating element may be selected from a flexible wire element or the like.

The actuating element includes a first end portion located close to the cap, and includes a second end portion located in the outlet conduit of the exit of the outlet piece, and includes at least one projection extended from the second end portion of the actuating element for forming at least one passage and for allowing the sealing preparation to selectively flow through the passage and then to selectively flow out through the outlet conduit of the exit of the outlet piece.

A coupler may further be provided for engaging with the exit of the outlet piece, and for selectively engaging with the second end portion of the actuating element and for selectively disengaging the cap from the outlet piece when the actuating element is moved relative to the outlet piece with the coupler.

The actuating element includes a barrel attached to the projection for slidably and stably engaging with the outlet conduit of the exit of the outlet piece. The outlet piece includes a chamber formed therein and communicative with the outlet conduit of the exit of the outlet piece for releasably and temporarily engaging with the cap.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
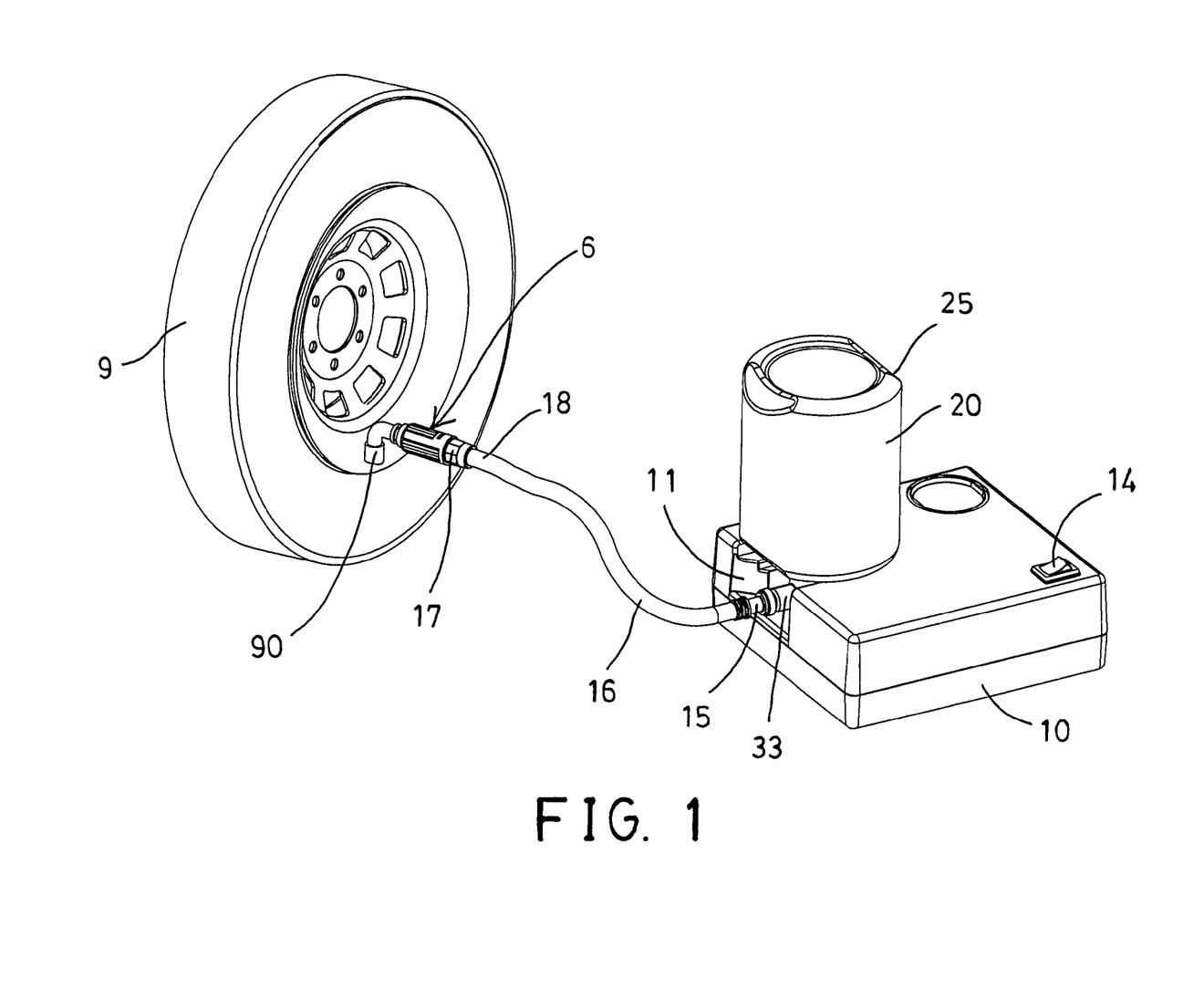
FIG. 1 is a perspective view of a sealing and inflating assembly in accordance with the present invention.
Figure 2:
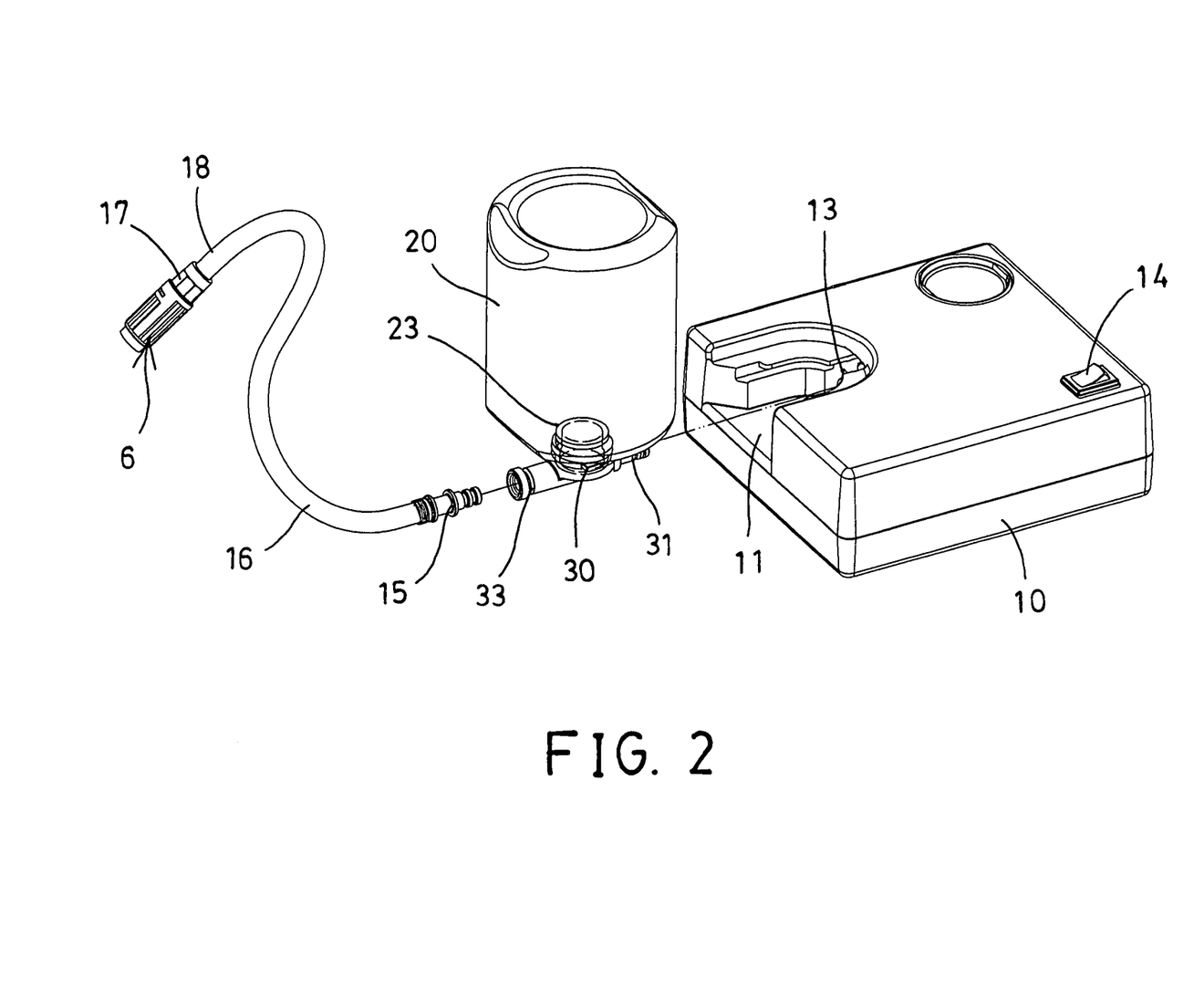
FIG. 2 is a partial exploded view of the sealing and inflating assembly.
Figure 3:
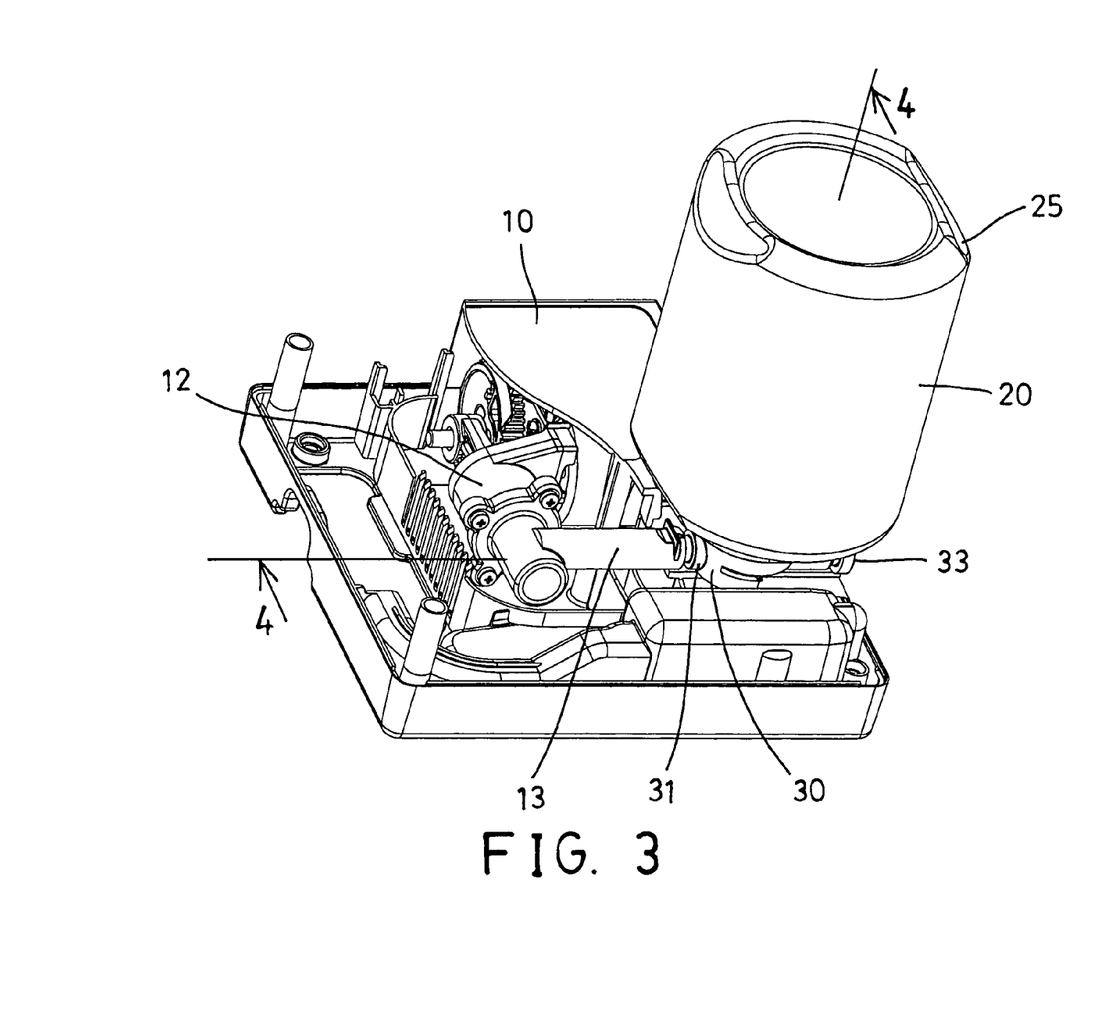
FIG. 3 is another perspective view of the tire repairing container of the sealing and inflating assembly, in which a portion of the sealing and inflating assembly has been cut off for showing the inner structure of the sealing and inflating assembly.

Referring to the drawings, and initially to FIGS. 1-3, a sealing and inflating assembly in accordance with the present invention comprises a receptacle 10 including a socket opening 11 formed therein, an air compressing device 12 disposed or received or engaged into the receptacle 10 and including an outlet tube 13 extended outwardly therefrom and partially extended into the socket opening 11 of the receptacle 10, and a control switch 14 electrically connected or coupled to the air compressing device 12 for controlling or operating the air compressing device 12 to selectively generate a pressurized air of a relatively greater air pressure and a decreased flowing quantity. The above-described structure is typical and will not be described in further details.

Several examples of the typical air compressing devices or sealing and inflating devices are disclosed in the cited prior U.S. Patents which may be taken as the references for the present invention. For example, the pressurized air is provided for being supplied to inflate various air facilities or inflatable objects 9, such as tires 9 (FIG. 1), air beds, air cushions, hovercrafts, etc. A tire repairing container 20 is further provided and includes a compartment 21 formed therein (FIGS. 4-5 and 7) for receiving a sealing preparation 22 (FIG. 7) and for selectively supplying the sealing preparation 22 to seal and inflate the inflatable objects 9, such as vehicle tires 9, air beds, air cushions, hovercrafts, etc., and includes a mouth opening 23 formed or provided on the upper or lower portion of the tire repairing container 20 for filling or discharging the sealing preparation 22 into or from the compartment 21 of the tire repairing container 20.

The tire repairing container 20 further includes an outlet mouth or piece 30 attached and secured to the mouth opening 23 of the tire repairing container 20 with latches or fasteners, adhesive materials or threading engagements 24, for blocking or enclosing the mouth opening 23 of the tire repairing container 20 and for confining and retaining the sealing preparation 22 within the compartment 21 of the tire repairing container 20. Normally, the sealing preparation 22 has not been fully filled within the compartment 21 of the tire repairing container 20, and a space 26 will be formed in a base portion 25 of the compartment 21 of the tire repairing container 20 when the tire repairing container 20 is disposed upside down, best shown in FIG. 7, or when the mouth opening 23 and the outlet piece 30 are located at the lower portion of the tire repairing container 20. A gasket or washer 29 is preferably provided and attached or mounted or engaged between the mouth opening 23 and the outlet piece 30 for making a water or fluid tight seal between the mouth opening 23 and the outlet piece 30.

The outlet piece 30 will be engaged into the socket opening 11 of the receptacle 10 and includes an entrance 31 for attaching or securing or coupling to the outlet tube 13 and for allowing the pressurized air from the air compressing device 12 to be suitably supplied to the outlet piece 30 and then into the compartment 21 of the tire repairing container 20, and includes an inlet conduit 32 formed therein and communicative with the entrance 31 thereof for suitably guiding the pressurized air to flow through the outlet piece 30 and then into the compartment 21 of the tire repairing container 20. The outlet piece 30 further includes an exit 33 having an outlet conduit 34 formed therein and communicative with the compartment 21 of the tire repairing container 20, but offset from the inlet conduit 32 of the entrance 31 of the outlet piece 30 for allowing the sealing preparation 22 in the compartment 21 of the tire repairing container 20 to selectively flow out through the outlet conduit 34 of the exit 33 of the outlet piece 30, for example, the outlet conduit 34 of the exit 33 of the outlet piece 30 may be coupled to the air facilities or inflatable objects 9, such as tires 9, air beds, air cushions, hovercrafts, etc. with a coupler 15 and a hose 16, in which a nozzle 6 is provided on or attached to a free end portion 18 of the hose 16 with an attachment or fitting 17 for engaging with an air inlet valve 90 of the tire 9, and thus for allowing the pressurized air to be suitably supplied into the compartment 21 of the tire repairing container 20, and then to force the sealing preparation 22 in the compartment 21 of the tire repairing container 20 to flow to and to inflate the inflatable objects 9 or vehicle tires 9 or the like.

Figure 4:
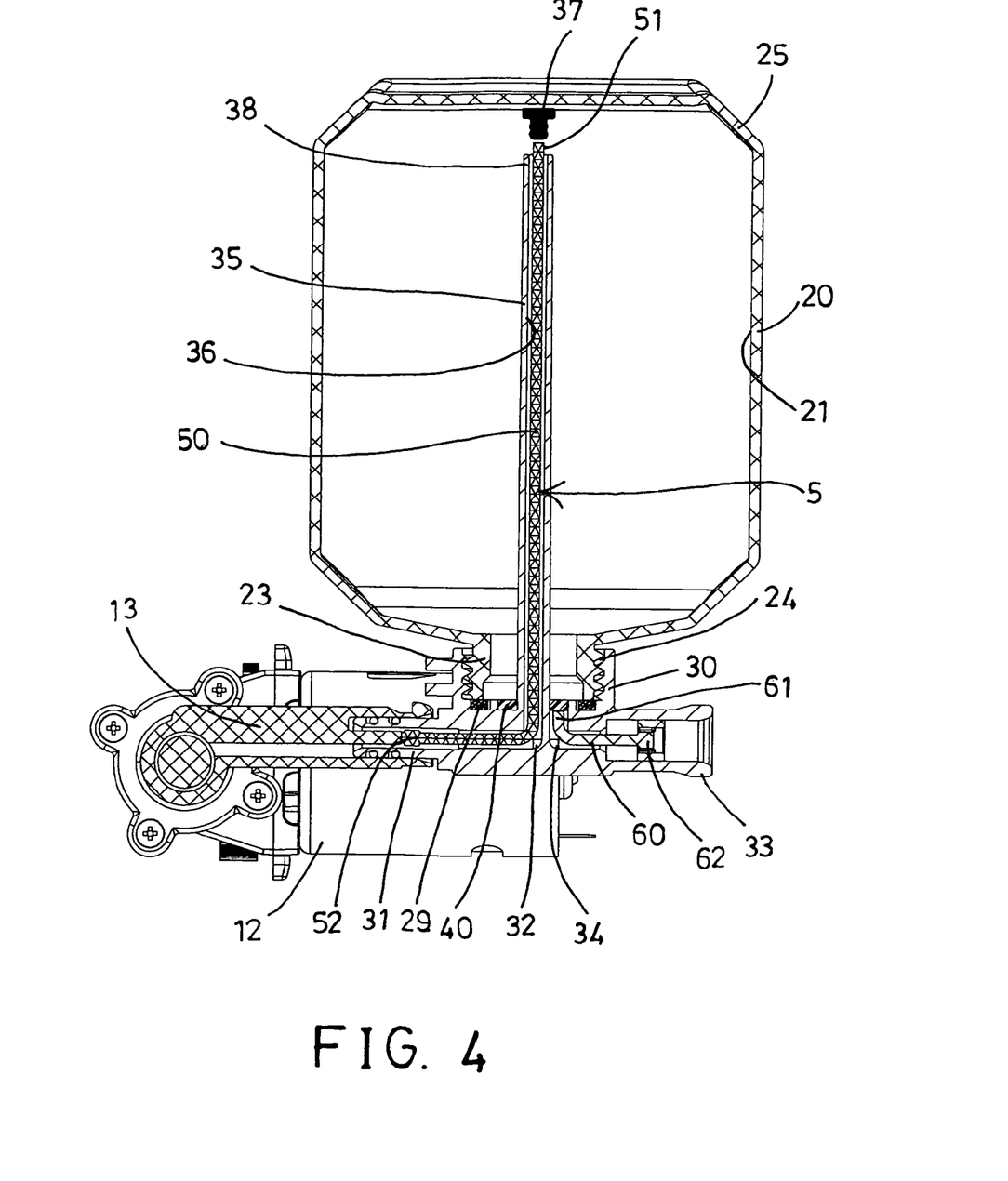
FIG. 4 is a partial cross sectional view illustrating a tire repairing container of the sealing and inflating assembly, taken along lines 4-4 of FIG. 3.
Figure 5:
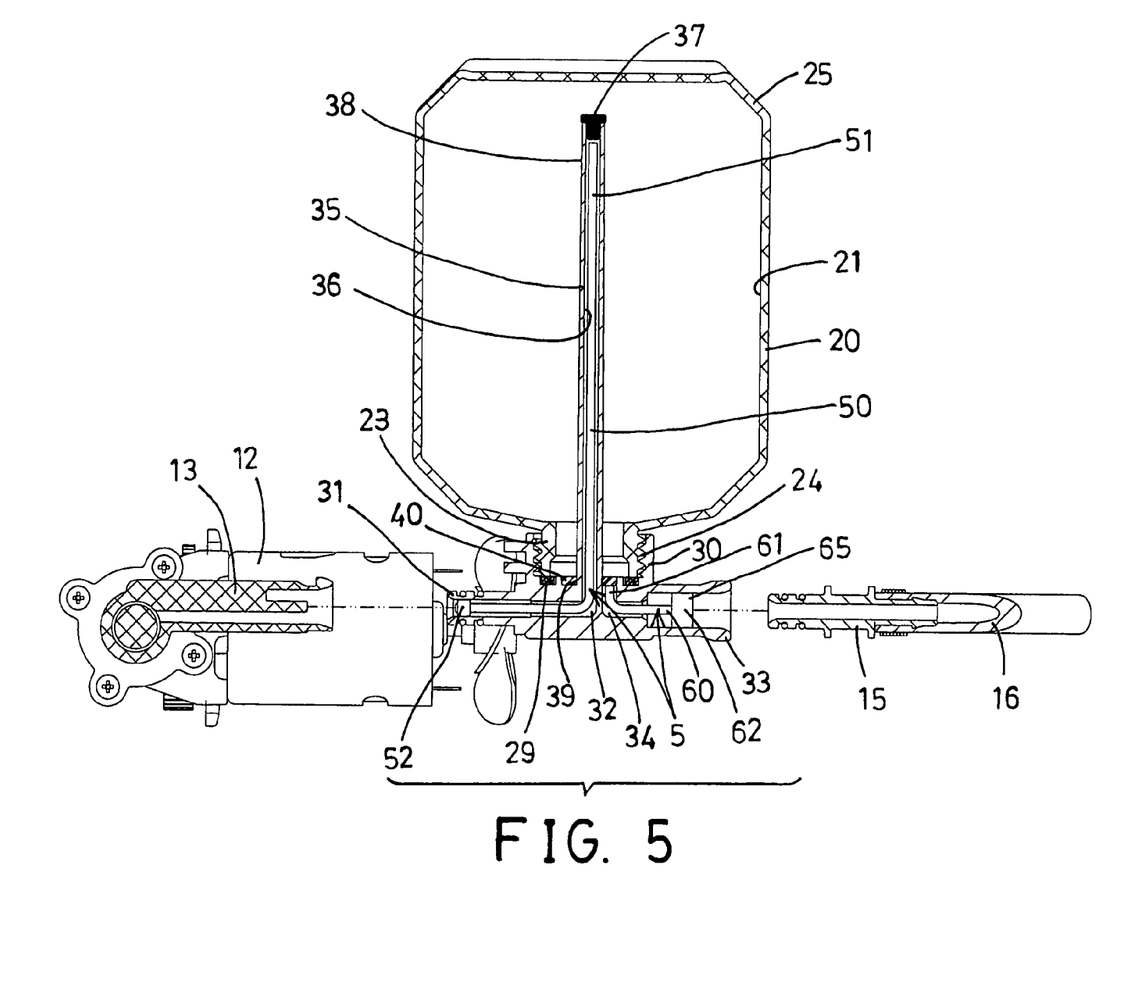
FIG. 5 is a partial cross sectional and exploded view of the sealing and inflating assembly.
Figure 6:
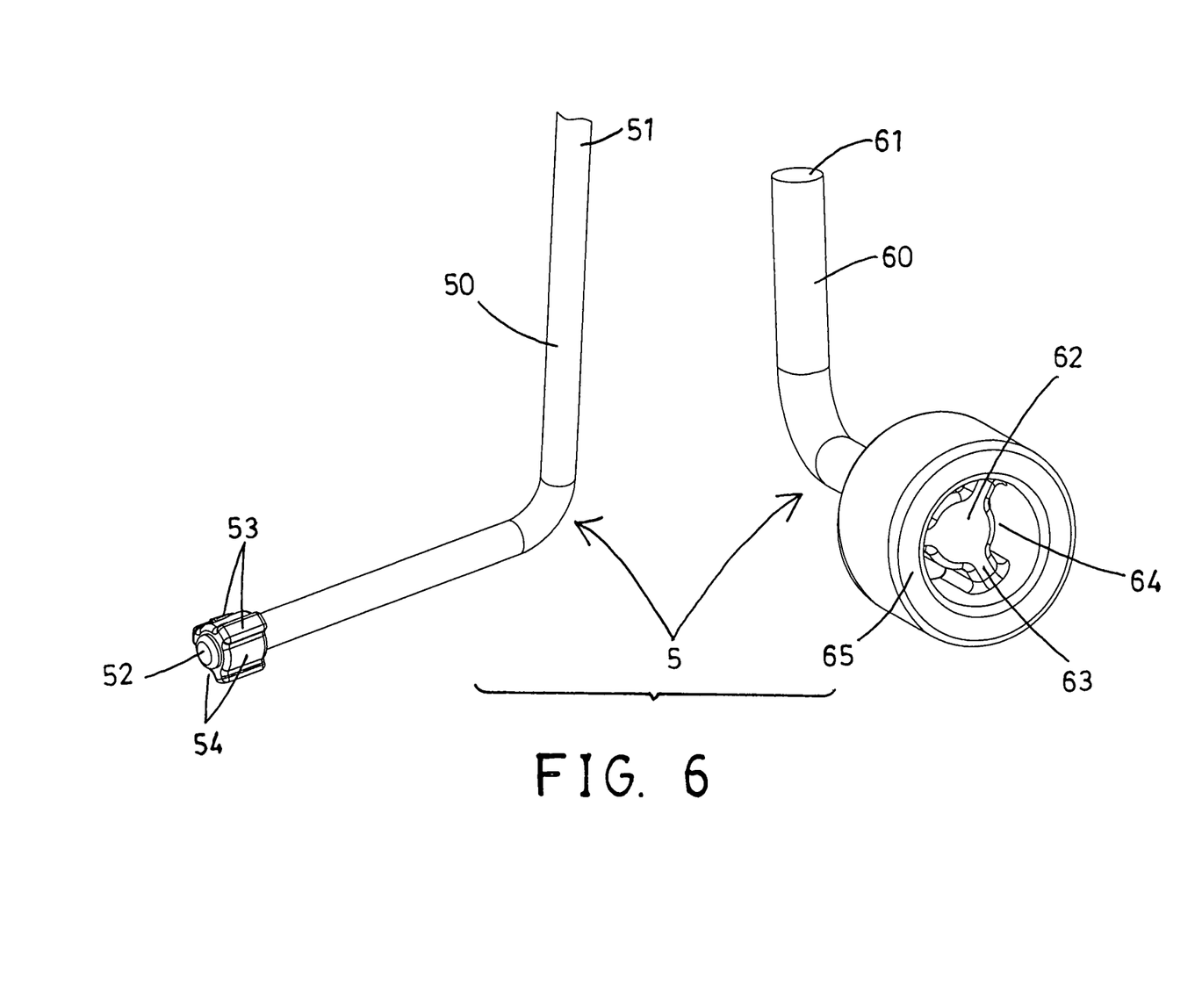
FIG. 6 is a partial exploded view illustrating an actuating member and an actuating element of an actuating device for the tire repairing container of the sealing and inflating assembly.
Figure 7:
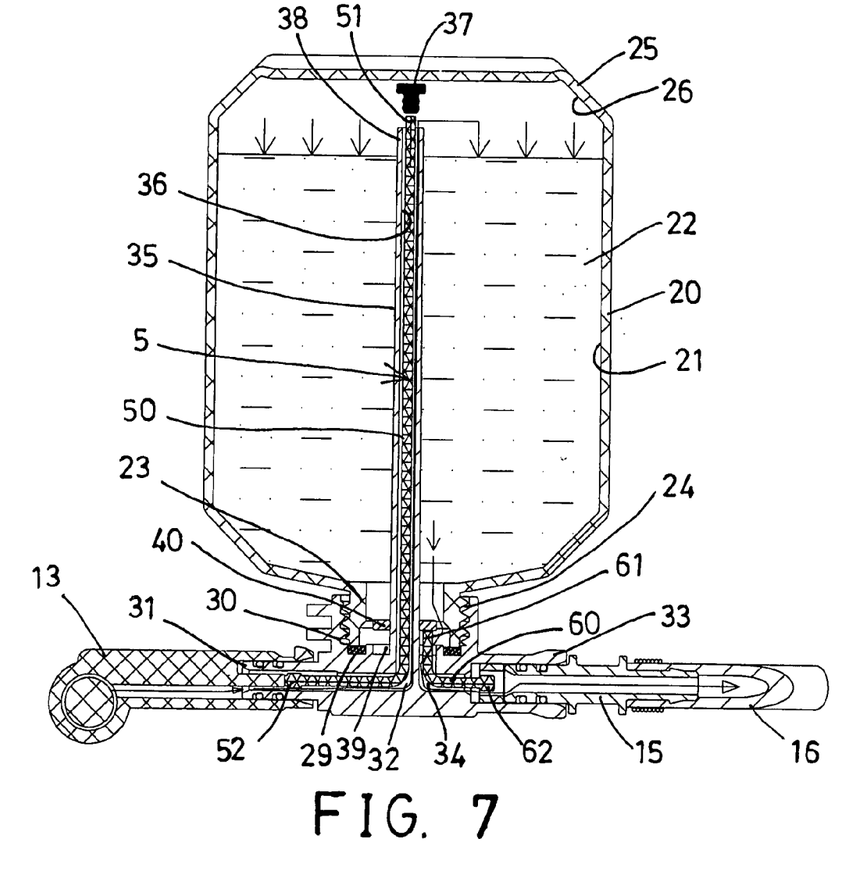
FIG. 7 is a partial cross sectional view similar to FIG. 4, illustrating the operation of the sealing and inflating assembly.
Figure 8:
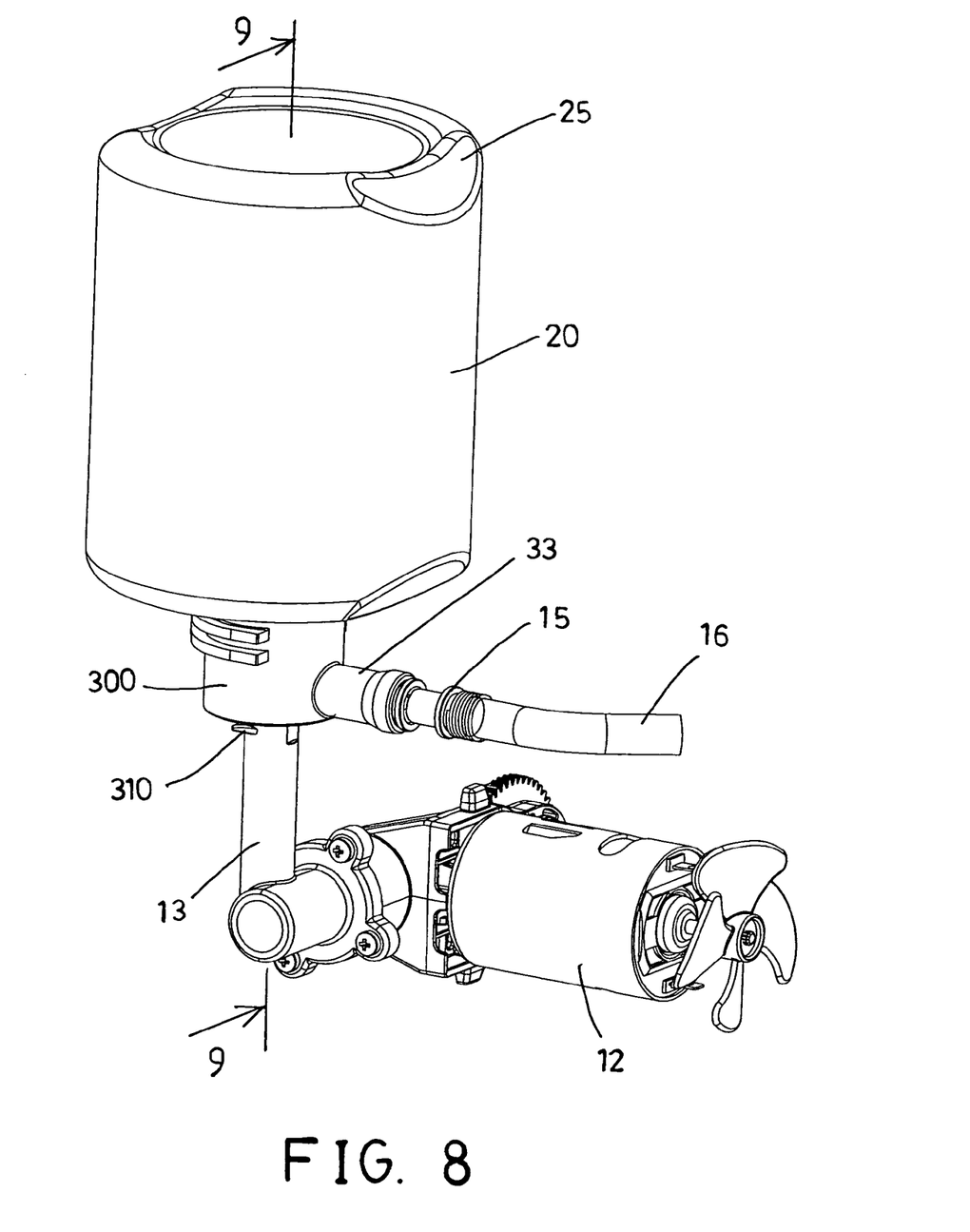
FIG. 8 is a perspective view illustrating the other arrangement of the sealing and inflating assembly.
Figure 9:
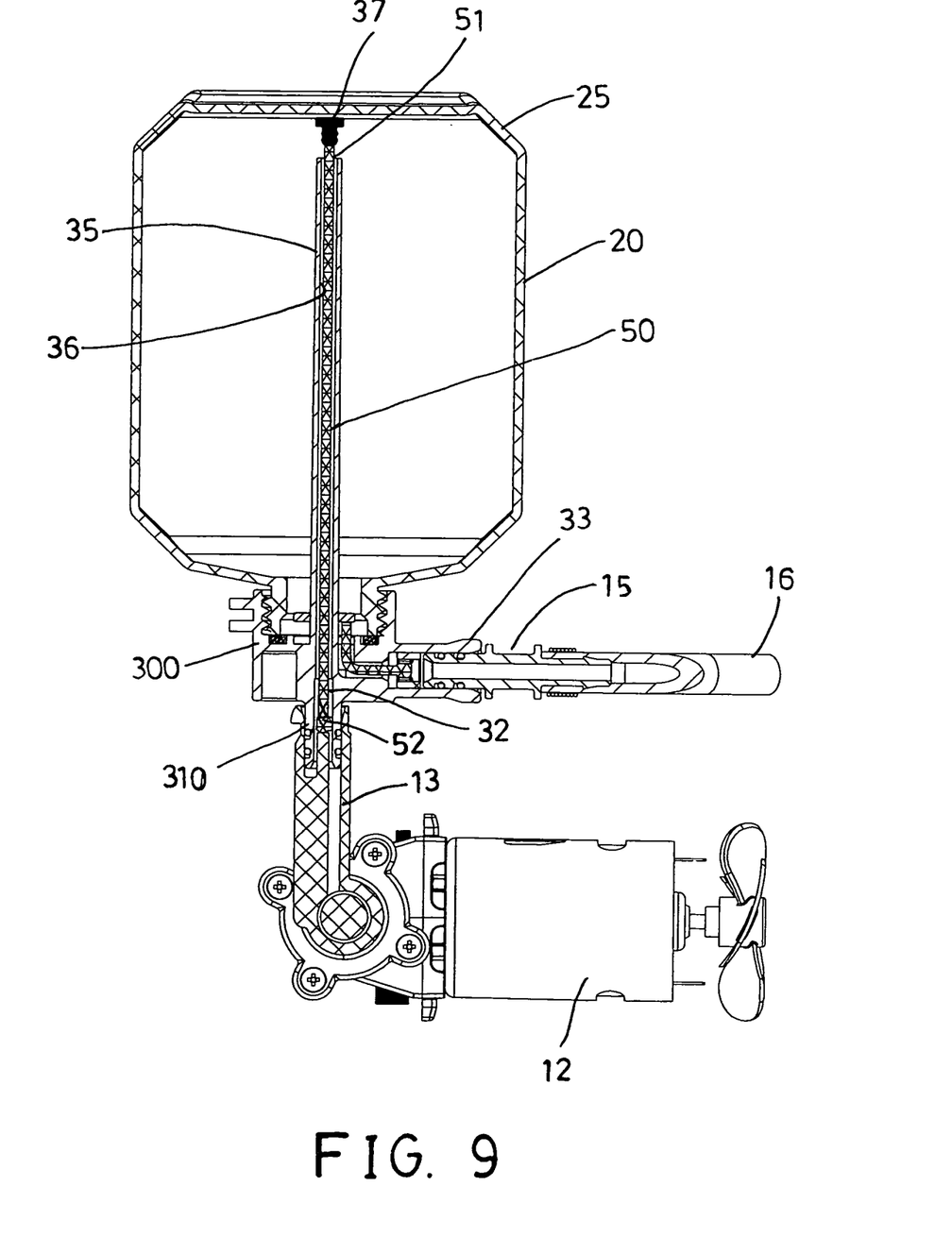
FIG. 9 is a partial cross sectional view of the sealing and inflating assembly, taken along lines 9-9 of FIG. 8.
Figure 10:
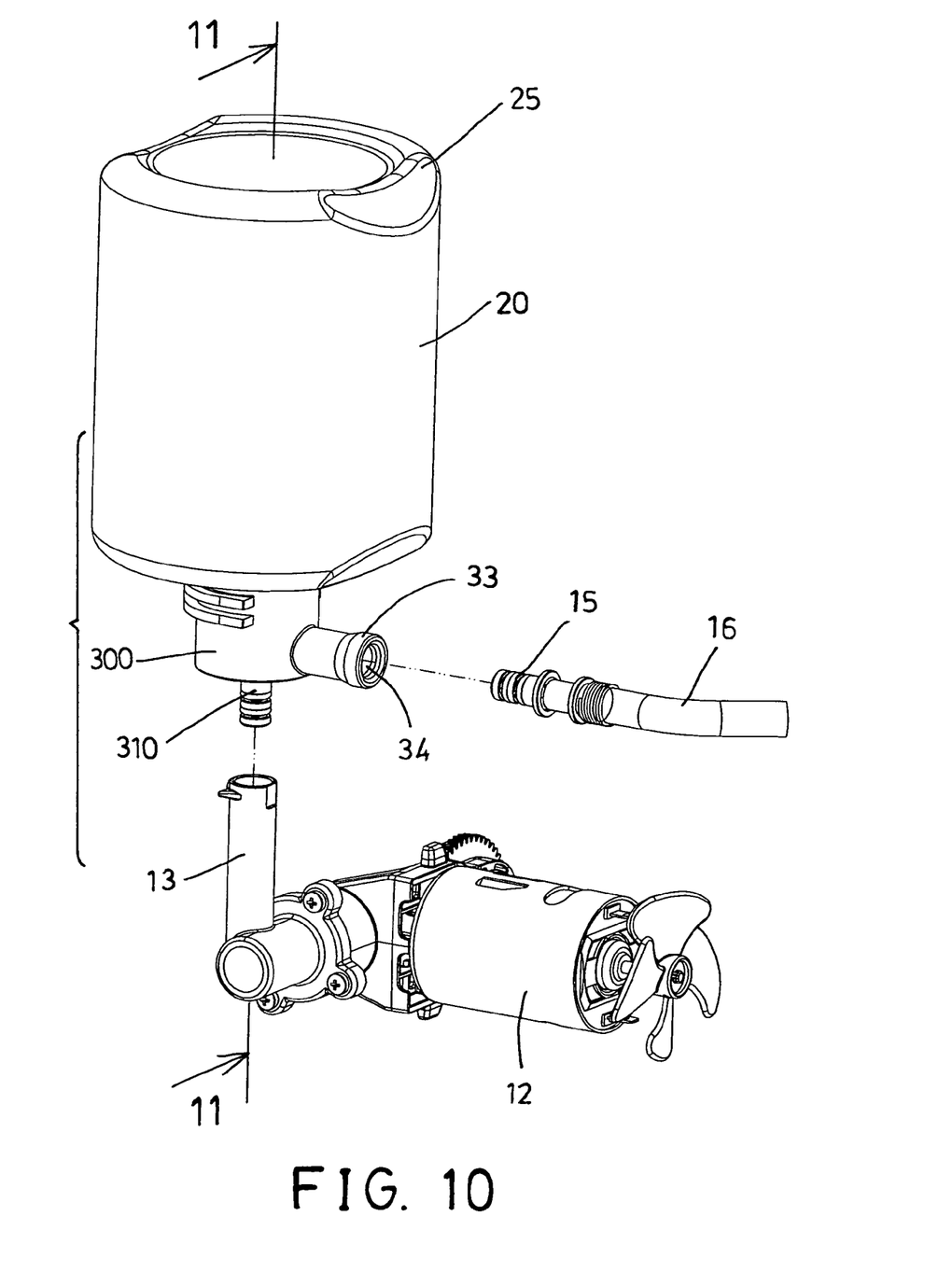
FIG. 10 is a partial exploded view of the sealing and inflating assembly as shown in FIGS. 8-9.
Figure 11:
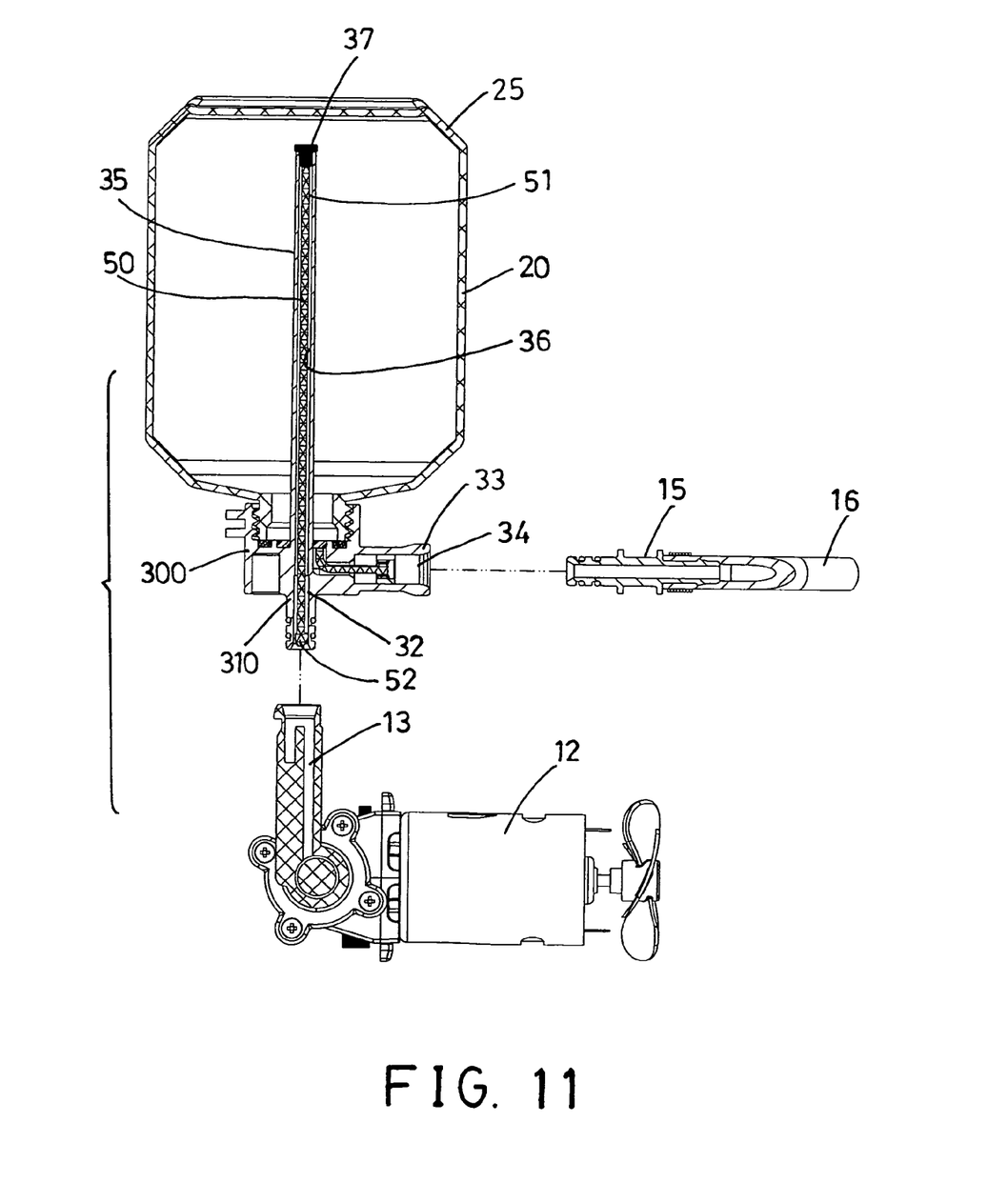
FIG. 11 is a partial cross sectional and exploded view of the sealing and inflating assembly, taken along lines 11-11 of FIG. 10.

As shown in FIGS. 4-5 and 7, the outlet piece 30 includes a protruded stud or pipe 35 extended therein or extended outwardly therefrom and extended or protruded and engaged into the compartment 21 of the tire repairing container 20, and includes a bore 36 formed in the pipe 35 and communicative with the inlet conduit 32 of the outlet piece 30 for directing or guiding the pressurized air to flow through the bore 36 of the pipe 35 and then to flow into the space 26 that is formed in the base portion 25 of the compartment 21 of the tire repairing container 20, best shown in FIG. 7, and includes a cover 37 releasably or temporarily attached or mounted onto the upper or inner portion 38 of the pipe 35 for releasably or temporarily blocking or enclosing or sealing the bore 36 of the pipe 35 and for preventing the sealing preparation 22 from flowing into the bore 36 of the pipe 35 before the cover 37 is removed or disengaged from the upper or inner portion 38 of the pipe 35. The entrance 31 of the outlet piece 30 is perpendicular to the pipe 35 and aligned with or in line with or parallel to the exit 33 of the outlet piece 30.

The outlet piece 30 includes a chamber 39 formed or defined therein (FIG. 5) and formed or located around the pipe 35 and communicative with the outlet conduit 34 of the exit 33 of the outlet piece 30 for suitably guiding the sealing preparation 22 in the compartment 21 of the tire repairing container 20 to selectively and suitably flow through the peripheral chamber 39 of the outlet piece 30 and to flow out through the outlet conduit 34 of the exit 33 of the outlet piece 30, and includes a sealing ring or gasket or seal or cap 40 releasably or temporarily disposed or attached or engaged into the peripheral chamber 39 of the outlet piece 30 for releasably or temporarily blocking or enclosing or sealing the outlet conduit 34 of the exit 33 of the outlet piece 30, the sealing preparation 22 may be forced to flow through the peripheral chamber 39 of the outlet piece 30 and to flow out through the outlet conduit 34 of the exit 33 of the outlet piece 30 when the cap 40 is removed or disengaged from the peripheral chamber 39 of the outlet piece 30.

Before using, as shown in FIG. 5, the upper or inner portion 38 of the pipe 35 or the bore 36 of the pipe 35, and thus the inlet conduit 32 of the entrance 31 of the outlet piece 30 may be releasably or temporarily blocked or sealed by the cover 37 for preventing the sealing preparation 22 from flowing into the bore 36 of the pipe 35, and the outlet conduit 34 of the exit 33 of the outlet piece 30 may also be releasably or temporarily blocked or sealed by the cap 40 for preventing the sealing preparation 22 from flowing out through the outlet conduit 34 of the exit 33 of the outlet piece 30, such that the tire repairing container 20 may be disposed or arranged or located either above or below the outlet piece 30 or in any position relative to the outlet piece 30 without worrying about the flowing of the sealing preparation 22 into or out of both the inlet conduit 32 of the entrance 31 and the outlet conduit 34 of the exit 33 of the outlet piece 30.

As shown in FIGS. 4-7, the tire repairing container 20 further includes an actuating device 5 having an actuating member 50 slidably received or engaged in the inlet conduit 32 of the entrance 31 of the outlet piece 30 and/or in the bore 36 of the pipe 35 for selectively engaging with the cover 37 and for selectively removing or disengaging the cover 37 from the upper or inner portion 38 of the pipe 35 (FIG. 7) and thus for allowing the pressurized air to be selectively flown through the inlet conduit 32 of the entrance 31 of the outlet piece 30 and the bore 36 of the pipe 35 and supplied into the space 26 of the compartment 21 of the tire repairing container 20, and then to selectively force the sealing preparation 22 in the compartment 21 of the tire repairing container 20 to flow to and to inflate the inflatable objects 9 or vehicle tires 9 or the like.

For example, the actuating member 50 of the actuating device 5 includes a longitudinal or flexible structure or is a flexible wire member 50 to be slidably received or engaged in the inlet conduit 32 of the entrance 31 of the outlet piece 30 and the bore 36 of the pipe 35, and includes an outer diameter smaller than that of the inlet conduit 32 of the entrance 31 of the outlet piece 30 and the bore 36 of the pipe 35 for allowing the pressurized air to selectively flow through the gap or space formed between the actuating member 50 and the outlet piece 30 and the pipe 35. The actuating member 50 includes an inner or first end portion 51 located close to the cover 37 for selectively engaging with the cover 37 and for selectively removing or disengaging the cover 37 from the upper or inner portion 38 of the pipe 35, and includes an outer or second end portion 52 located in the inlet conduit 32 of the entrance 31 of the outlet piece 30, and includes one or more (such as three) ribs or protrusions 53 extended radially and outwardly therefrom, such as extended outwardly from the outer or second end portion 52 thereof for forming or defining one or more passages 54 between the protrusions 53 and for allowing the pressurized air to selectively flow through the passages 54 between the protrusions 53 and into the inlet conduit 32 of the entrance 31 of the outlet piece 30 and the bore 36 of the pipe 35.

As shown in FIGS. 4-5 and 7, the length of the actuating member 50 is slightly longer than that of the inlet conduit 32 of the entrance 31 of the outlet piece 30 and the bore 36 of the pipe 35, or the inner or first end portion 51 of the actuating member 50 is arranged to be moved to engage with the cover 37 and to remove or disengage the cover 37 from the upper or inner portion 38 of the pipe 35 when the outlet tube 13 is engaged into the entrance 31 of the outlet piece 30 and engaged with the outer or second end portion 52 of the actuating member 50; i.e., the actuating member 50 may not be moved to engage with the cover 37 and to remove or disengage the cover 37 from the upper or inner portion 38 of the pipe 35 before the outlet tube 13 is engaged into the entrance 31 of the outlet piece 30 and engaged with the outer or second end portion 52 of the actuating member 50.

The actuating device 5 further includes an actuating element 60 slidably received or engaged in the outlet conduit 34 of the exit 33 of the outlet piece 30 for selectively engaging with the cap 40 and for selectively removing or disengaging the cap 40 from the outlet piece 30 (FIG. 7) and thus for allowing the sealing preparation 22 to be selectively flown out through the outlet conduit 34 of the exit 33 of the outlet piece 30 and supplied to inflate the inflatable objects 9 or vehicle tires 9 or the like. For example, the actuating element 60 of the actuating device 5 includes a longitudinal or flexible structure or is a flexible wire element 60 to be slidably received or engaged in the outlet conduit 34 of the exit 33 of the outlet piece 30, and includes an outer diameter smaller than that of the outlet conduit 34 of the exit 33 of the outlet piece 30 for allowing the sealing preparation 22 to selectively flow through the gap or space that is formed or defined between the actuating element 60 and the outlet piece 30.

The actuating element 60 includes an inner or first end portion 61 located close to the cap 40 for selectively engaging with the cap 40 and for selectively removing or disengaging the cap 40 from the chamber 39 of the outlet piece 30, and includes an outer or second end portion 62 located in the outlet conduit 34 of the exit 33 of the outlet piece 30, and includes one or more (such as three) ribs or projections 63 extended radially and outwardly therefrom, such as extended outwardly from the outer or second end portion 62 thereof (FIG. 6) for forming or defining one or more passages 64 between the projections 63 and for allowing the sealing preparation 22 to selectively flow through the passages 64 between the projections 63 and to selectively flow out through the outlet conduit 34 of the exit 33 of the outlet piece 30, and includes an outer peripheral member or sleeve or barrel 65 formed or provided on or attached to the outer peripheral portion of the projections 63 for stably and slidably received or engaged in the outlet conduit 34 of the exit 33 of the outlet piece 30.

As shown in FIGS. 4-5 and 7, the length of the actuating element 60 is slightly longer than that of the outlet conduit 34 of the exit 33 of the outlet piece 30, or the inner or first end portion 61 of the actuating element 60 is arranged to be moved to engage with the cap 40 and to remove or disengage the cap 40 from the chamber 39 of the outlet piece 30 when the coupler 15 is engaged into the exit 33 of the outlet piece 30 and engaged with the outer or second end portion 62 of the actuating element 60; i.e., the actuating element 60 may not be moved to engage with the cap 40 and to remove or disengage the cap 40 from the chamber 39 of the outlet piece 30 before the coupler 15 is engaged into the exit 33 of the outlet piece 30 and engaged with the outer or second end portion 62 of the actuating element 60.

In operation, as shown in FIG. 7, when the outlet tube 13 is engaged into the entrance 31 of the outlet piece 30 and engaged with the outer or second end portion 52 of the actuating member 50, the actuating member 50 may be forced to move into or relative to the pipe 35 and to move or disengage the cover 37 from the pipe 35, and the pressurized air may then be supplied and flown from the outlet tube 13 into the entrance 31 and the inlet conduit 32 of the outlet piece 30 and may also flow through the bore 36 of the pipe 35 and may then flow into the space 26 that is formed in the base portion 25 of the compartment 21 of the tire repairing container 20 without flowing through the sealing preparation 22. When the coupler 15 is engaged into the exit 33 of the outlet piece 30 and engaged with the outer or second end portion 62 of the actuating element 60, the actuating element 60 may be forced to move into or relative to the outlet piece 30 and to move or disengage the cap 40 from the chamber 39 of the outlet piece 30, and the pressurized air may then force the sealing preparation 22 to flow out through the outlet conduit 34 of the exit 33 of the outlet piece 30.

Alternatively, as shown in FIGS. 8-11, the entrance 310 of the outlet piece 300 may be extended outwardly therefrom and perpendicular to the exit 33 or the outlet piece 300 or aligned with or in line with or parallel to the pipe 35 for coupling to the outlet tube 13, and the bore 36 of the pipe 35 may be in line with the inlet conduit 32 of the entrance 310 of the outlet piece 300 and arranged for allowing the outlet tube 13 to be easily and quickly engaged into the entrance 310 of the outlet piece 300.

Accordingly, the sealing and inflating assembly includes an air compressing device having an improved tire repairing container for quickly coupling to an outlet tube and for quickly disengaging from the air compressor and for allowing the tire sealing preparation to be effectively supplied to seal and inflate the inflatable objects, and for easily and quickly and changeably attaching and securing to the outlet tube of the air compressor, and having an actuating member for easily opening the pipe and for allowing the pressurized air to easily flow into the compartment of the tire repairing container and for allowing the tire sealing preparation to be effectively supplied to seal and inflate the inflatable objects.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A sealing and inflating assembly comprising:
   a tire repairing container including a compartment formed therein for receiving a sealing preparation, and including a mouth opening formed therein,
   an outlet piece attached to said mouth opening of said tire repairing container, and including an entrance having an inlet conduit formed therein for guiding a pressurized air to flow through said outlet piece and then into said compartment of said tire repairing container, and including an exit having an outlet conduit formed therein and communicative with said compartment of said tire repairing container for allowing the sealing preparation in said compartment of said tire repairing container to selectively flow out through said outlet conduit of said exit of said outlet piece, and said outlet piece including a pipe extended therefrom and engaged into said compartment of said tire repairing container, and including a bore formed in said pipe and communicative with said inlet conduit of said outlet piece for guiding the pressurized air to flow through said bore of said pipe and into said compartment of said tire repairing container,
   a cover releasably attached to said pipe for releasably blocking said bore of said pipe and for preventing the sealing preparation from flowing into said bore of said pipe before said cover is removed from said pipe,
   a cap releasably attached to said outlet piece for releasably blocking said outlet conduit of said exit of said outlet piece and for allowing the sealing preparation to selectively flow out through said outlet conduit of said exit of said outlet piece when said cap is disengaged from said outlet piece, and
   an actuating device for selectively disengaging said cover from said pipe and for selectively disengaging said cap from said outlet piece and for allowing the pressurized air to be selectively flown through said inlet conduit of said entrance of said outlet piece and said bore of said pipe and into said compartment of said tire repairing container, and to selectively force the sealing preparation in said compartment of said tire repairing container to flow out through said outlet conduit of said exit of said outlet piece.

2. The sealing and inflating assembly as claimed in claim 1, wherein said actuating device includes an actuating member engaged in said inlet conduit of said entrance of said outlet piece and in said bore of said pipe for selectively engaging with said cover and for selectively disengaging said cover from said pipe when said actuating member is moved relative to said outlet piece.

3. The sealing and inflating assembly as claimed in claim 2, wherein said actuating member is selected from a flexible wire member.

4. The sealing and inflating assembly as claimed in claim 2, wherein said actuating member includes a first end portion located close to said cover, and includes a second end portion located in said inlet conduit of said entrance of said outlet piece, and includes at least one protrusion extended from said second end portion of said actuating member for forming at least one passage and for allowing the pressurized air to selectively flow through said at least one passage and to flow through said inlet conduit of said entrance of said outlet piece and said bore of said pipe.

5. The sealing and inflating assembly as claimed in claim 4 further comprising an air compressing device including an outlet tube for engaging with said entrance of said outlet piece, and for selectively engaging with said second end portion of said actuating member and for selectively disengaging said cover from said pipe when said actuating member is moved relative to said outlet piece with said outlet tube.

6. The sealing and inflating assembly as claimed in claim 1, wherein said actuating device includes an actuating element engaged in said outlet conduit of said exit of said outlet piece for selectively engaging with said cap and for selectively disengaging said cap from said outlet piece when said actuating element is moved relative to said outlet piece.

7. The sealing and inflating assembly as claimed in claim 6, wherein said actuating element is selected from a flexible wire element.

8. The sealing and inflating assembly as claimed in claim 6, wherein said actuating element includes a first end portion located close to said cap, and includes a second end portion located in said outlet conduit of said exit of said outlet piece, and includes at least one projection extended from said second end portion of said actuating element for forming at least one passage and for allowing the sealing preparation to selectively flow through said at least one passage and to flow out through said outlet conduit of said exit of said outlet piece.

9. The sealing and inflating assembly as claimed in claim 8 further comprising a coupler for engaging with said exit of said outlet piece, and for selectively engaging with said second end portion of said actuating element and for selectively disengaging said cap from said outlet piece when said actuating element is moved relative to said outlet piece with said coupler.

10. The sealing and inflating assembly as claimed in claim 8, wherein said actuating element includes a barrel attached to said at least one projection for engaging with said outlet conduit of said exit of said outlet piece.

11. The sealing and inflating assembly as claimed in claim 1, wherein said outlet piece includes a chamber formed therein and communicative with said outlet conduit of said exit of said outlet piece for releasably engaging with said cap.

12. The sealing and inflating assembly as claimed in claim 1, wherein said entrance of said outlet piece is perpendicular to said pipe.

13. The sealing and inflating assembly as claimed in claim 1, wherein said entrance of said outlet piece is parallel to said exit of said outlet piece.

14. The sealing and inflating assembly as claimed in claim 1, wherein said entrance of said outlet piece is parallel to said pipe.

15. The sealing and inflating assembly as claimed in claim 1, wherein said entrance of said outlet piece is in line with said pipe.

* * * * *